(12) United States Patent
Aoki

(10) Patent No.: US 7,118,480 B2
(45) Date of Patent: Oct. 10, 2006

(54) METHOD, APPARATUS, STORAGE MEDIUM AND PROGRAM FOR GENERATING IMAGE DATA OF VIRTUAL SPACE

(75) Inventor: Hidefumi Aoki, Toyonaka (JP)

(73) Assignee: Namco Bandi Games Inc., Tokyo (JP)

( * ) Notice: Subject to any disclaimer, the term of this patent is extended or adjusted under 35 U.S.C. 154(b) by 605 days.

(21) Appl. No.: 10/201,715

(22) Filed: Jul. 24, 2002

(65) Prior Publication Data
US 2003/0032477 A1   Feb. 13, 2003

(30) Foreign Application Priority Data
Aug. 3, 2001   (JP)   ............................. 2001-237086

(51) Int. Cl.
*G06F 17/00*   (2006.01)
*G06F 19/00*   (2006.01)

(52) U.S. Cl. ........................ 463/30; 463/31; 463/32; 463/33; 463/34; 345/139; 345/418; 345/419

(58) Field of Classification Search ........ 345/418–419, 345/139; 463/30–34
See application file for complete search history.

(56) References Cited

U.S. PATENT DOCUMENTS

| | | | | |
|---|---|---|---|---|
| 4,215,861 A * | 8/1980 | Nemeth | ........................ | 463/3 |
| 5,325,472 A * | 6/1994 | Horiuchi et al. | ............. | 345/427 |
| 5,356,156 A * | 10/1994 | Suzuki et al. | ................. | 463/31 |
| 5,779,548 A * | 7/1998 | Asai et al. | ..................... | 463/31 |
| 6,045,229 A * | 4/2000 | Tachi et al. | .................... | 353/28 |
| 6,151,026 A * | 11/2000 | Iwade et al. | ................. | 345/420 |
| 6,323,895 B1 * | 11/2001 | Sata | ............................. | 348/39 |
| 6,377,277 B1 * | 4/2002 | Yamamoto | .................. | 345/629 |
| 6,549,200 B1 * | 4/2003 | Mortlock et al. | ........... | 345/419 |
| 6,622,062 B1 * | 9/2003 | Earl et al. | .................... | 700/193 |
| 6,676,518 B1 * | 1/2004 | Sawa et al. | ................... | 463/31 |
| 6,760,020 B1 * | 7/2004 | Uchiyama et al. | .......... | 345/419 |
| 6,767,285 B1 * | 7/2004 | Haga et al. | .................... | 463/31 |
| 6,906,708 B1 * | 6/2005 | Katayama | ................... | 345/419 |
| 2001/0040575 A1 * | 11/2001 | Haga et al. | ................. | 345/473 |
| 2002/0090995 A1 * | 7/2002 | Haga et al. | .................... | 463/31 |
| 2003/0100366 A1 * | 5/2003 | Nagase | ........................ | 463/33 |

FOREIGN PATENT DOCUMENTS

JP     A 11-197358     7/1999

OTHER PUBLICATIONS

Sim City 3000: Instruction Manual. Sim City 3000, Released on Jan. 31, 1999. Scanned Copy. [online] [retrieved on Jul. 25, 2005] Retrieved from The Game Manul Archive <URL: http://www.gamemanuals.net/>. Attaching PDF Print Out (10 pages).*

* cited by examiner

*Primary Examiner*—John M. Hotaling, II
*Assistant Examiner*—Milap Shah
(74) *Attorney, Agent, or Firm*—Oliff & Berridge, PLC

(57) ABSTRACT

A method for generating image data of a virtual space viewed from a predetermined view point, comprises: determining a boundary of a predetermined plane area in the virtual space; providing a line object having one boundary line portion which is at least one portion of the boundary and a predetermined width in a direction of an inside of the plane area; and changing the width of the line object with fixing the one boundary line portion.

16 Claims, 16 Drawing Sheets

FIG.3

| LINE POLYGON | LENGTH | WIDTH |
|---|---|---|
| 1 | L1 | W |
| 2 | L1 | W |
| 3 | L2 | W |
| 4 | L2 | W |
| 5 | L3 | W |
| 6 | L3 | W |
| 7 | L2 | W |
| 8 | L2 | W |
| 9 | L4 | W |

FIG.11

|  |  | COORDINATES | FIXED FLAG | MOVING DIRECTION |
|---|---|---|---|---|
| LINE POLYGON 1 | VERTEX P1 | $(x_1,y_1,z_1)$ | ON | * |
| | P2 | $(x_2,y_2,z_2)$ | ON | * |
| | P3 | $(x_3,y_3,z_3)$ | OFF | +x |
| | P4 | $(x_4,y_4,z_4)$ | OFF | +x |
| ⋮ | ⋮ | ⋮ | ⋮ | ⋮ |
| LINE POLYGON 9 | | | | |

520

$\theta' = \theta - \Delta\theta$

METHOD, APPARATUS, STORAGE MEDIUM AND PROGRAM FOR GENERATING IMAGE DATA OF VIRTUAL SPACE

BACKGROUND OF THE INVENTION

1. Field of the Invention

The invention relates to a method, an apparatus, a storage medium and a program for generating image data of a virtual space, and in particular, a game space.

2. Description of Related Art

Conventionally, there are some games wherein players play ball in a court (predetermined area) provided in a three dimensional game space, among ball games, for example, a tennis game and so on. In the games, there is a problem that lines (white lines) forming the court are not seen easily or disappear according to an eyes direction of a virtual camera.

The above-described problem is a phenomenon which extremely occurs mainly as an angle between the eyes direction of the virtual camera and a normal vector of each of polygons (line polygons) representing the lines is vertical. Further, the phenomenon can also occur in case the virtual camera and each of the lines separate from each other.

SUMMARY OF THE INVENTION

The present invention was developed in view of the above-described problems.

In accordance with a first aspect of the present invention, a method for generating image data of a virtual space viewed from a predetermined view point (for example, a virtual camera 20 shown in FIG. 1), comprises: determining a boundary of a predetermined plane area (for example, a tennis court 10 shown in FIG. 1) in the virtual space; providing a line object (for example, line objects 1 to 4 shown in FIG. 2) having one boundary line portion (for example, in case of a line object 1, a line between vertexes P1 and P2 shown in FIG. 4) which is at least one portion of the boundary and a predetermined width in a direction of an inside of the plane area; and changing the width of the line object with fixing the one boundary line portion.

Herein, the line object is an object continuing for a predetermined length so as to be straight or curved. For example, when the plane area is a tennis court, the line object is an object having an external straight line portion of a doubles sideline, a base line or the like, as the boundary line portion. When the plane area is a baseball field, the line object is an object having an external straight line portion of a foul line or the like, or an external curved line portion of an infield-outfield border or the like, as the boundary line portion.

In accordance with a second aspect of the present invention, an apparatus (for example, a game apparatus 100 show in FIG. 10) comprises: an image generating section (for example, an image generation unit 420 shown in FIG. 10) for generating image data of a virtual space viewed from a predetermined view point (for example, a virtual camera 20 shown in FIG. 1); a determining section (for example, a game operation unit 410 shown in FIG. 10) for determining a boundary of a predetermined plane area (for example, a tennis court 10 shown in FIG. 1) in the virtual space; a providing section (for example, a game operation unit 410 shown in FIG. 10) for providing a line object (for example, line objects 1 to 4 shown in FIG. 2) having one boundary line portion which is at least one portion of the boundary and a predetermined width in a direction of an inside of the plane area; and a changing section (for example, a vertex coordinates change unit 412 shown in FIG. 10) for changing the width of the line object with fixing the one boundary line portion.

According to the method of the first aspect or the apparatus of the second aspect of the present invention, it is possible to change the width of the line object provided in the virtual space, having one boundary line portion which is at least one portion of the boundary of the predetermined plane area and which is fixed. That is, because the width of the line object is widened, it is possible to prevent the phenomenon from occurring that a line (white line) is not seen easily or disappears as an angle between a normal line vector of the line object and an eyes direction (eyes vector) at the view point becomes vertical.

Further, because the direction in which the width of the line object is changed is the inside of the plane area, the plane area provided in the virtual space is not changed. Consequently, in case the virtual space is a game space of a predetermined game, it is possible to prevent the changing the width of the line object from affecting a progress of the game.

Preferably, in the method of the first aspect of the present invention, the changing the width of the line object comprises changing a width of one end portion of the line object and a width of the other end portion of the line object separately.

Preferably, in the apparatus of the second aspect of the present invention, the changing section changes a width of one end portion of the line object and a width of the other end portion of the line object separately.

According to the above-described method or the above-described apparatus, it is possible to change both the width of one end portion and the width of the other end portion of the line object separately. That is, because the width of one end portion of the line object, which is positioned far in the virtual space is changed larger than the width of the other end portion of the line object, which is positioned near in the virtual space, it is possible to prevent the phenomenon from occurring that a line (white line) is not seen easily or disappears.

Preferably, in the method of the first aspect of the present invention, the changing the width of the line object comprises changing the width of the line object on the basis of at least one of a position, a depression angle, an eyes direction and a view angle of the view point.

According to the above-described method, it is possible to change the width of the line object on the basis of various conditions regarding the view point. That is, for example, if the width of the line object which is changed is widened as a height of the view point from the plane area is small, on the basis of the position of the view point, it is possible to prevent the phenomenon from occurring that a line (white line) is not seen easily or disappears.

Further, if the width of the line object which is changed is widened as the depression angle, the eyes direction or the view angle of the view point is small, it is possible to obtain the same effect as the above-described case.

Preferably, in the method of the first aspect of the present invention, the changing the width of the line object comprises changing the width of the line object on the basis of at least one of a distance between the view point and the plane area and a distance between the view point and the line object.

According to the above-described method, it is possible to change the width of the line object on the basis of a distance between the view point and the plane area or the line object. That is, because the width of the line object which is changed is widened as the distance is large, it is possible to prevent the phenomenon from occurring that a line (white line) is not seen easily or disappears.

Preferably, in the method of the first aspect of the present invention, the changing the width of the line object affects regenerating the image data of the virtual space.

According to the above-described method, it is possible to change the width of the line object when regenerating the image data.

Preferably, the method of the first aspect of the present invention, further comprises: inclining the line object at a predetermined angle with fixing the one boundary line portion.

According to the above-described method, it is possible to incline the line object at the predetermined angle with fixing the one boundary line portion. That is, it is possible to prevent the phenomenon from occurring that a line (white line) is not seen easily or disappears as a normal line vector of the line object and the eyes direction (eyes vector) becomes parallel to each other.

Preferably, in the method of the first aspect of the present invention, the line object comprises at least one of a straight line object and a curved line object.

Preferably, in the method of the first aspect of the present invention, the one boundary line portion is at least one side of the boundary when the line object is a straight line object.

Preferably, in the method of the first aspect of the present invention, the providing the line object comprises providing an internal line object having one line portion and another line portion each of which is not one portion of the boundary, and a predetermined width; and the changing the width of the line object comprises changing the width of the internal line object by moving both the one line portion and the another line portion.

Preferably, in the method of the first aspect of the present invention, the virtual space is a game space of a predetermined game.

Preferably, the apparatus of the second aspect of the present invention, further comprises a game execution unit for executing a predetermined game according to image data of a game space of the predetermined game, which is generated by the image generation section as the virtual space.

In accordance with a third aspect of the present invention, a method for generating image data of a virtual space viewed from a predetermined view point, comprises: determining a boundary of a predetermined plane area in the virtual space; providing at least one line object having a predetermined width on the basis of the boundary; and changing the width of the line object by moving at least one line portion of the line object.

In accordance with a fourth aspect of the present invention, a storage medium has a program recorded thereon, when the program is loaded onto an operating apparatus, the program making the operating apparatus execute the method as described above.

In accordance with a fifth aspect of the present invention, a program, when the program is loaded onto an operating apparatus, makes the operating apparatus execute the method as described above.

According to the storage medium of the fourth aspect or the program of the fifth aspect of the present invention, it is possible to obtain the same effects as the method of the first aspect of the present invention.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIG. 3 is a table showing an example of a length and a width of each of line polygons forming the tennis court shown in FIG. 2;

FIG. 11 is a table showing an example of line polygon data;

PREFERRED EMBODIMENTS OF THE INVENTION

Hereinafter, a preferred embodiment of the present invention will be explained with reference to figures, in detail. Further, hereinafter, although the present invention will be explained in case the present invention is applied to, for example, a tennis game, it should be understood that the present invention is not limited to the case.

First, a principle of the present invention will be explained.

Figure 1:
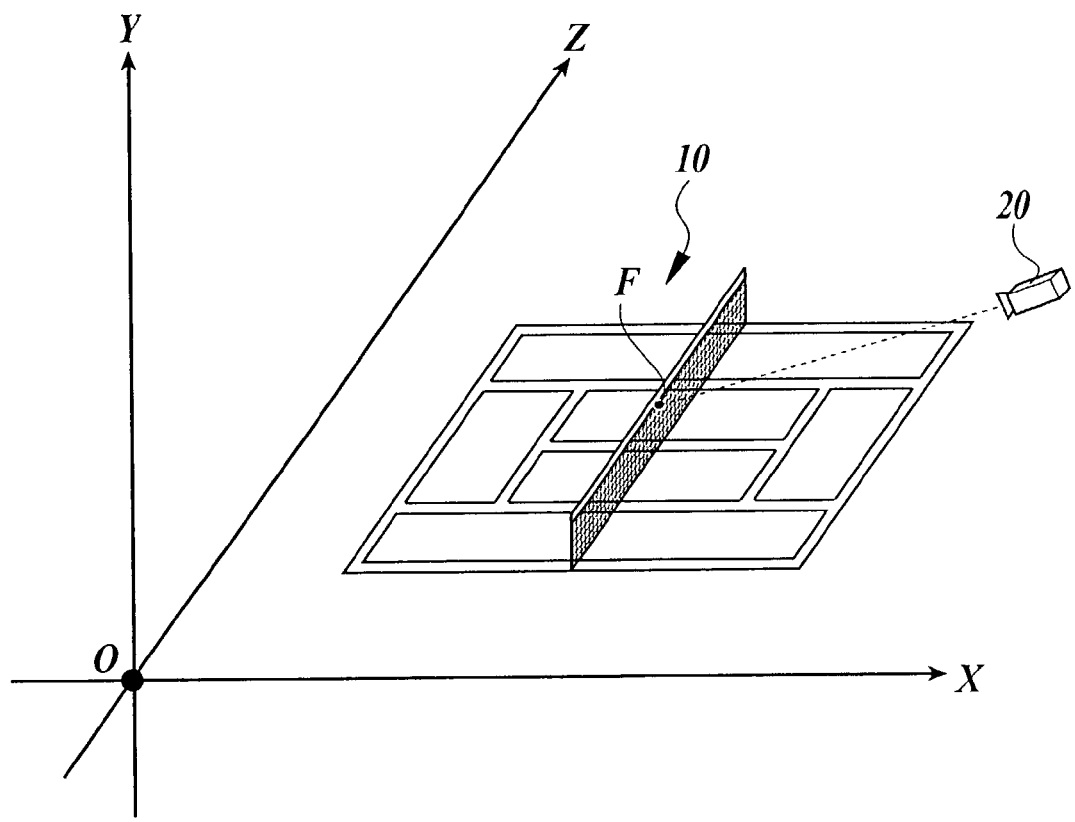
FIG. 1 is a view showing an example of a game space.

In the tennis game to which the present invention is applied, as shown in FIG. 1, a tennis court 10 and a virtual camera 20 are provided in a game space.

Herein, the game space means a virtual three dimensional space represented by the world coordinate system, that is, the XYZ rectangular coordinate system. Further, in the following explanation, coordinates values are represented by the world coordinate system while it is not limited specially.

FIG. 1 is a view showing an example of the game space of the tennis game.

As shown in FIG. 1, the tennis court 10 is provided in the X-Z plane of the game space so that a longitudinal direction (a right and left direction in FIG. 1) of the tennis court 10 coincides with the X-axis direction of the game space, a width direction (a far direction in FIG. 1) of the tennis court 10 coincides with the Z-axis direction of the game space, and a height direction of the tennis court 10 coincides with the Y-axis direction of the game space.

A plurality of player objects, a ball object and so on, which are not shown in figures are provided in the tennis court 10. Therefore, when a player or a computer instructs and controls a movement of the player object or the like, the tennis came is advanced.

The virtual camera 20 has a fixation point F at a center position of the tennis court 10, and is provided at a position wherein the almost whole tennis court 10 comes into sight of the virtual camera 20. The initial position of the virtual camera 20 is C (cx, cy, cz).

The state of the game space, viewed from the virtual camera 20 is displayed on a display or the like of a game apparatus, as the game image.

Figure 2:
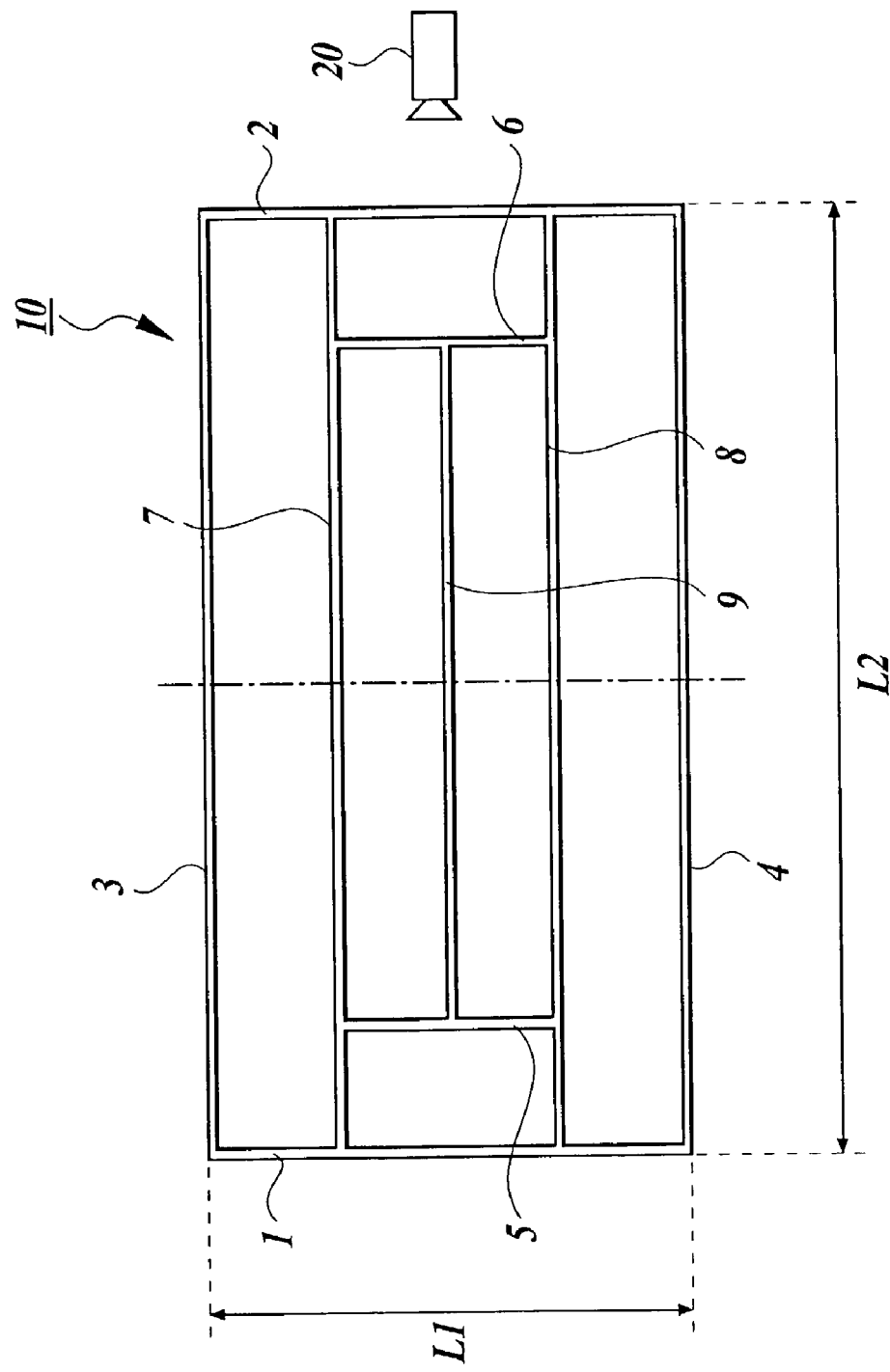
FIG. 2 is a view showing an example of a tennis court provided in the game space shown in FIG. 1.

The tennis court 10 consists of a plurality of lines, by combining them, as shown in FIG. 2.

FIG. 2 is a plan view showing a state wherein the tennis court 10 is viewed from the Y-axis direction.

As shown in FIG. 2, the tennis court 10 consists of nine lines in total, including two base lines, two doubles sidelines and so on.

Each of the nine lines is represented by corresponding one polygon. Hereinafter, nine polygons corresponding to the nine lines respectively will be called line polygons 1 to 9. That is, when nine line polygons 1 to 9 are combined and provided in the game space, the tennis court 10 lined with nine line polygons 1 to 9 is formed in the game space, as shown in FIG. 1.

Each of the line polygons 1 to 9 is a polygon formed in a rectangle, and has a length and a width shown in FIG. 3.

FIG. 3 is a table showing an example of the length and the width of each of line polygons 1 to 9.

As shown in FIG. 3, the length of each of the line polygons 1 and 2 is "L1" equally. The "L1" is equal to the length of the width direction of the tennis court 10. The length of each of the line polygons 3, 4, 7 and 8 is "L2" equally. The "L2" is equal to the length of the longitudinal direction of the tennis court 10. The length of each of the line polygons 5 and 6 is "L3" equally. The length of the line polygon 9 is "L4".

On the other hand, the width of each of the line polygons 1 to 9 is "W" equally.

Figure 4:
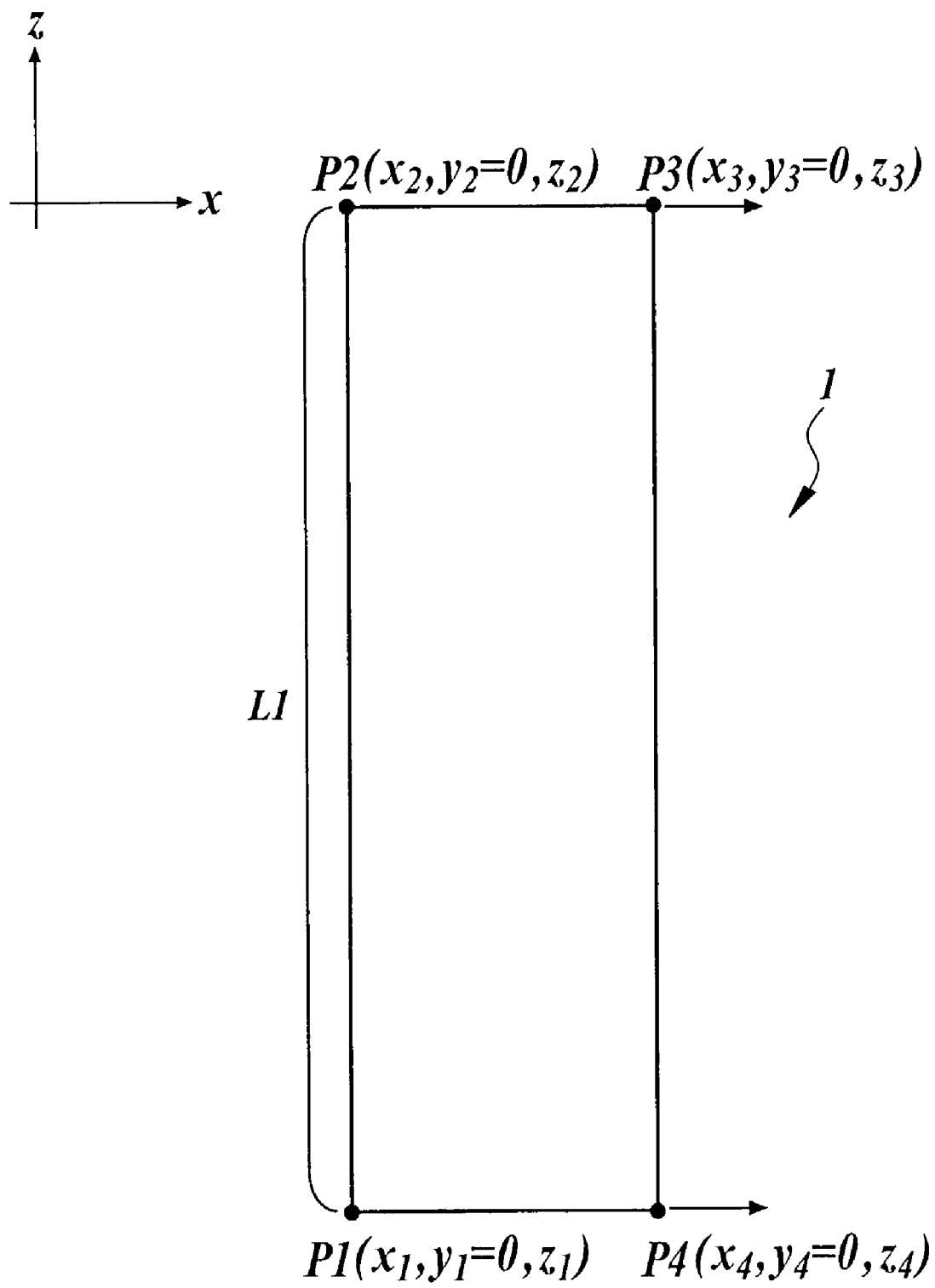
FIG. 4 is a view showing an example of a line polygon 1 forming the tennis court.

FIG. 4 is a view showing an example of the line polygon 1.

As shown in FIG. 4, the line polygon 1 has coordinates values, fixed flags and moving directions for four vertexes P1 to P4 respectively.

The fixed flag indicates whether the vertex having the fixed flag can move or not More specifically, the fixed flag is determined to be "OFF" when the vertex can move, and to be "ON" when the vertex cannot move.

Herein, to move the vertex means to change coordinates values of the vertex, and further, hereinafter, it means so. That is, when the coordinates values of the vertex is changed, the vertex is moved.

The moving direction indicates the direction in which the vertex is moved when the vertex can move, that is, when the fixed flag is "OFF". More specifically, the moving direction is determined to be "+x" or "−x" to move the vertex in the direction along the X-axis, and to be "+z" or "−z" to move the vertex in the direction along the Z-axis. The sign (+, −) indicates the direction in which the vertex is moved, in order to increase the width W of the line polygon.

For example, when the moving direction is "+x", in order to increase the width W, the vertex is moved in the positive direction along the X-axis. On the other hand, when the moving direction is "−x", the vertex is moved in the negative direction along the X-axis.

When the fixed flag is "ON", that is, when the vertex cannot move, the moving direction of the vertex is not determined specially, and represented by "*".

As shown in FIG. 4, regarding the vertex P1, the coordinates values are (x1, y1(=0), z1). The fixed flag is "ON". The moving direction is not determined specially, and represented by "*".

Regarding the vertex P2, the coordinates values are (x2, y2(=0), z2) The fixed flag is "ON", as well as the vertex P1. The moving direction is not determined specially, and represented by "*".

Regarding the vertex P3, the coordinates values are (x3, y3(=0), z3). The fixed flag is "OFF". The moving direction is determined to be "+x".

Regarding the vertex P4, the coordinates values are (x4, y4(=0), z4). The fixed flag is "OFF", as well as the vertex P3. The moving direction is determined to be "+x".

That is, in the line polygon 1, only the vertexes P3 and P4 can move among four vertexes P1 to P4. Therefore, as the vertexes P3 and P4 is moved in the positive direction along the X-axis, the width W of the line polygon 1 increases. Further, when the vertexes P3 and P4 are moved, only the width W of the line polygon 1 is changed, and the length L1 of the line polygon 1 is not changed specially.

Figure 5:
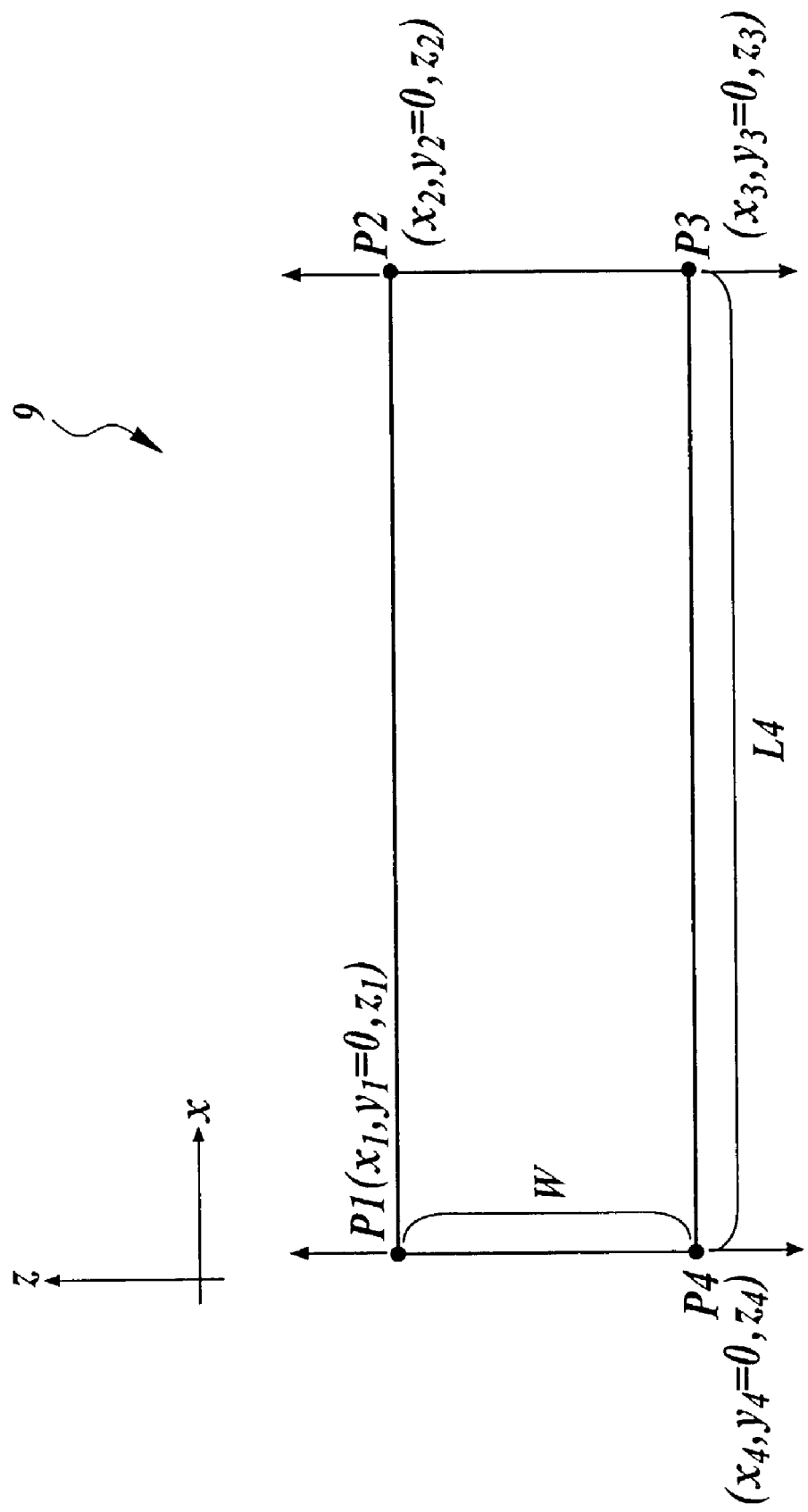
FIG. 5 is a view showing an example of a line polygon 9 forming the tennis court.

FIG. 5 is a view showing an example of the line polygon 9.

As shown in FIG. 5, the line polygon 9 has four vertexes P1 to P4. Regarding each of the four vertexes P1 and P4, the fixed flag is "OFF. Regarding each of the vertexes P1 and P2, the moving direction is "+z", and regarding each of the vertexes P3 and P4, the moving direction is "−z".

That is, in the line polygon 9, all the vertexes P1 to P4 can move. Therefore, as the vertexes P1 and P2 are moved in the positive direction along the Z-axis, and the vertexes P3 and P4 are moved in the negative direction along the Z-axis, the width W of the line polygon 9 increases. Further, when the vertexes P1 to P4 are moved, like the line polygon 1, only the width W of the line polygon 9 is changed, and the length L4 of the line polygon 9 is not changed specially.

Although the line polygons 2 to 8 are not explained specially, in detail, each of them has the structure like the above-described line polygon 1 or 9. In each of the line polygons 2 to 8, coordinates values, fixed flags and moving directions are determined for four vertexes P1 to P4, respectively.

Herein, it will be explained how to determine the fixed flag and the moving direction for each of the line polygons 1 to 9.

Figure 6:
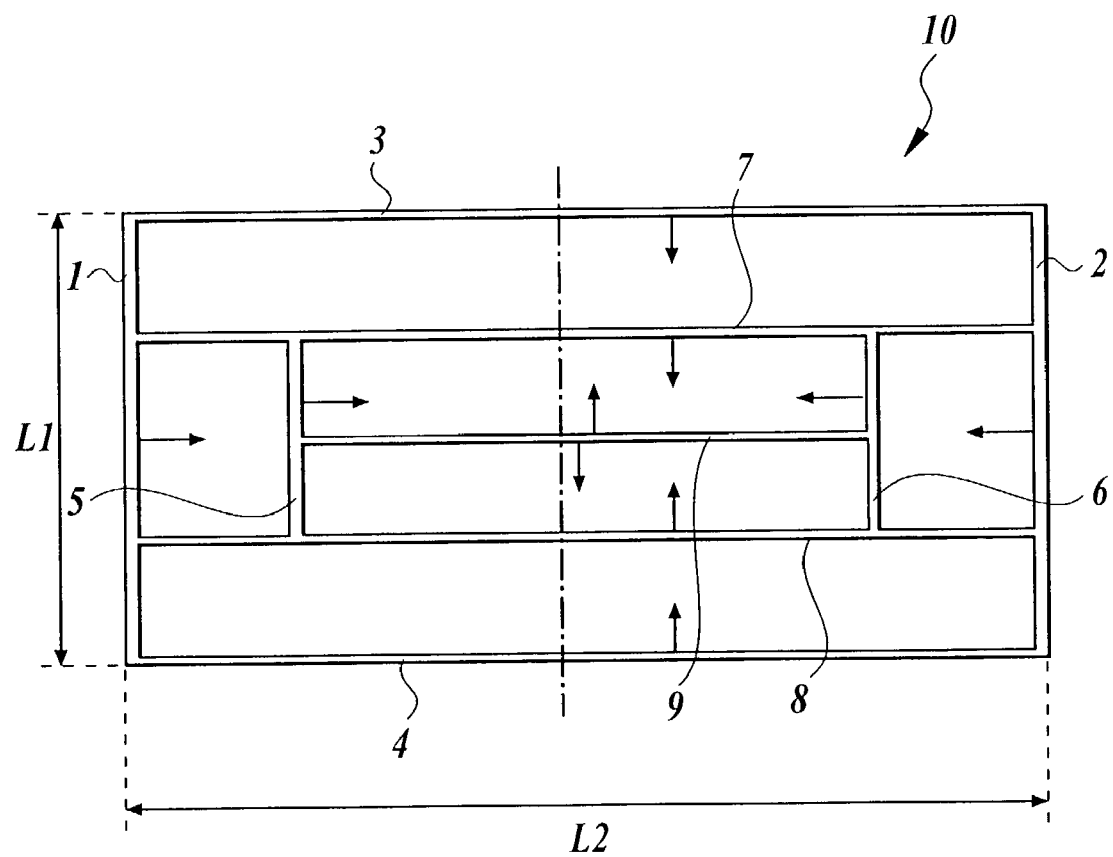
FIG. 6 is a view for explaining a change of width Ws of the line polygons.

FIG. 6 is a view for explaining the direction in which the width W of each of the line polygons 1 to 9 is changed.

As shown in FIG. 6, the line polygons 1 to 9 are changed in the arrow directions attached thereto respectively, so that the width Ws of the line polygons 1 to 9 increase. Therefore, because the width Ws of the line polygons 1 to 9 are changed according to the rule of tennis, it is possible to prevent the size (area) of the tennis court 10 from being changed carelessly.

That is, according to the rule of tennis, on the line is determined to be inside of the tennis court 10 (IN). Therefore, there is a case wherein a wrong condition occurs that the area determined to be inside of the tennis court 10 is changed by changing the widths Ws of the line polygons and the progress of the tennis game is affected thereby. Accordingly, in order to prevent the wrong condition from occurring, the line polygons 1 to 9 have the fixed flags and the moving directions respectively, so that the width Ws thereof are changed in the direction of the inside of the tennis court 10.

Further, for the above-described reason, the length L1 to L4 of the line polygons 1 to 9 are not changed.

For example, the line polygon 1 is changed so that the width W thereof increases in the right direction in FIG. 6. That is, as shown in FIG. 4, the line polygon 1 is changed so that the vertexes P1 and P2 are fixed and the vertexes P3 and P4 are moved in the positive direction along the X-axis.

Further, the line polygon 9 is changed so that the width W thereof increases in the upper direction and the lower direction in FIG. 6. That is, as shown in FIG. 5, the line polygon 9 is changed so that the vertexes P1 and P2 are moved in the positive direction along the Z-axis, and the vertexes P3 and P4 are moved in the negative direction along the Z-axis, in other words, so that all the vertexes P1 to P4 are moved along the Z-axis.

As described above, moving the vertexes of the line polygons 1 to 9, that is, changing the width Ws of the line polygons 1 to 9, is performed on the basis of the position of the virtual camera 20. Next, the relationship between changing the width of the line polygon and the position of the virtual camera 20 will be explained, as follows.

Figure 7:
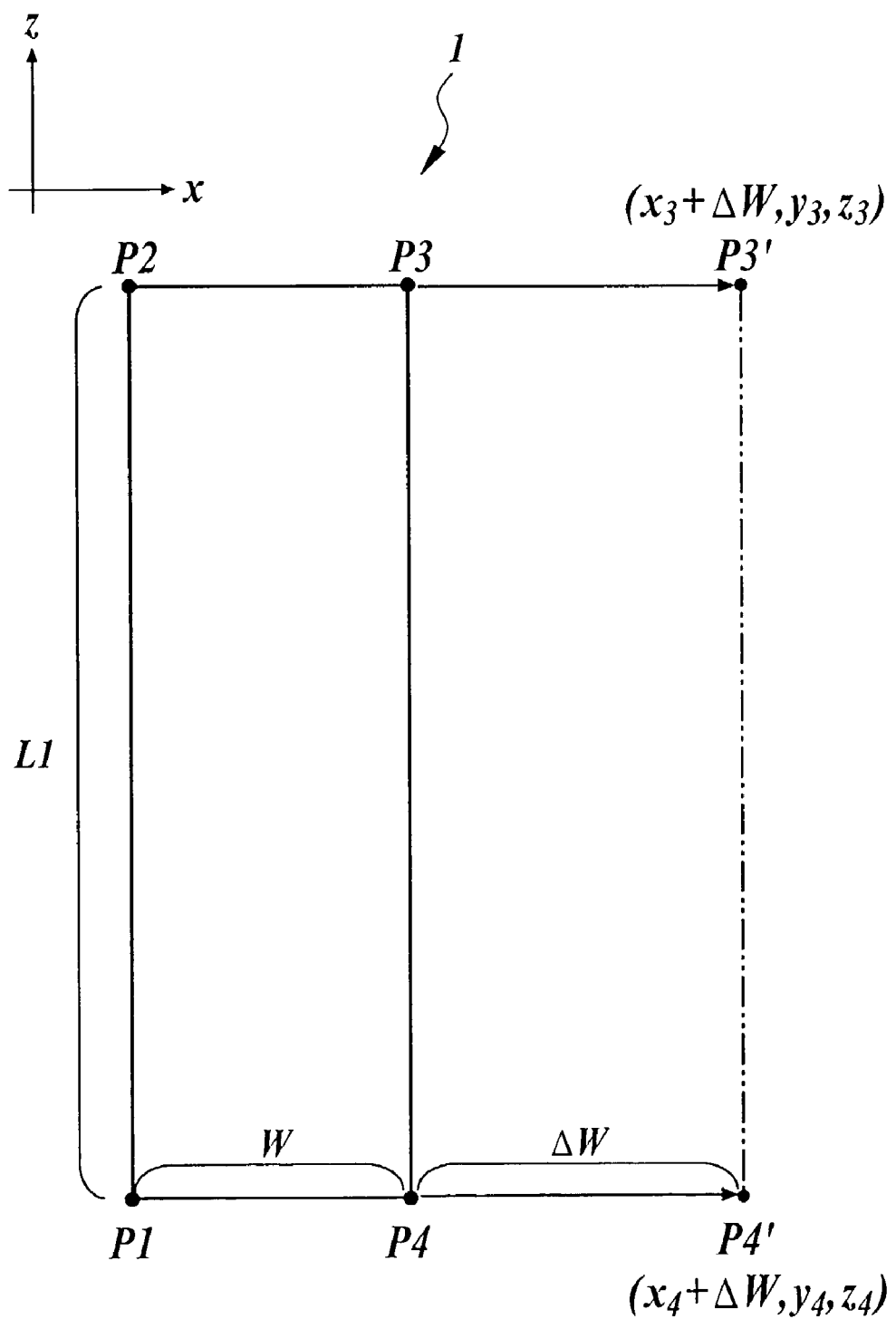
FIG. 7 is a view showing an example of the line polygon 1 changed.

FIG. 7 is a view showing an example of the line polygon after the line polygon 1 shown in FIG. 4 is changed.

As shown in FIG. 7, in the changed line polygon 1, the vertex P3 is moved to the vertex P3', and the vertex P4 is moved to the vertex P4'. Herein, the moving direction of each of the vertexes P3 and P4 is the positive direction along the X-axis, that is, the right direction in FIG. 7, as explained with reference to figures.

Further, the coordinates values of the vertex P3' are (x3+ΔW, y3, z3), and the coordinates values of the vertex P4' is (x4+ΔW, y4, z4).

That is, after the vertexes P3 and P4 are moved to the vertexes P3' and P4', the width of the line polygon 1 increases by ΔW, to be "W+ΔW". Herein, the change ΔW is larger than 0 (ΔW>0).

The length of the line polygon 1 is not changed, and keeps L1.

The change ΔW by which the width W of the line polygon 1 increases is determined on the basis of the position of the virtual camera 20, and in detail, on the basis of the change Δy of the height h of the virtual camera 20 from the X-Z plane. Rough speaking, as the height h of the virtual camera 20 lowers, the width W of the line polygon 1 increases. Herein, the height h of the virtual camera 20 is equal to the Y-coordinates values of the virtual camera 20.

Figure 8:
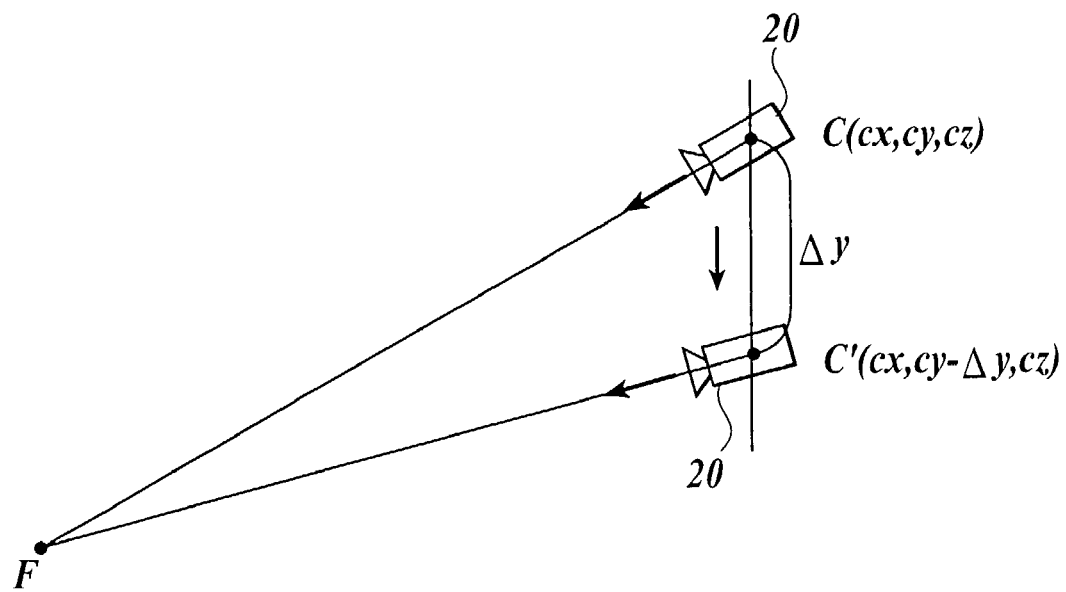
FIG. 8 is a view for explaining a change of a position of a virtual camera in the game space.

FIG. 8 is a view for explaining the change of the position of the virtual camera 20.

As shown in FIG. 8, the position of the virtual camera 20 changes from C(cx, cy, cz) as the initial position to C1(cx, cy−Δy, cz). That is, the height h of the virtual camera 20 lowers from "cy" to "cy−Δy", by "Δy". Herein, the change Δy is larger than 0 (Δy>0).

When the height h of the virtual camera 20 changes, because the fixation point F is fixed, the eyes direction (eyes vector) also changes according to the change of the position of the virtual camera 20.

Therefore, the vertexes of the line polygon 1 is moved so that the width W of the line polygon 1 increases by ΔW (>0) according to the change Δy of the height h of the virtual camera 20.

The vertexes having the fixed flags "OFF" are moved, as explained with reference to figures.

The change ΔW of the width W of the line polygon is obtained by the following equation (1).

$$\Delta W = f(\Delta y) \quad (1)$$

According to the equation (1), the change ΔW of the width W of the line polygon 1 is represented by the function "f" with the change Δy of the height h of the virtual camera 20, as a parameter.

The function "f" may be any function. However, in order to represent the phenomenon wherein the width W of the line polygon 1 increases (widens) as the height h of the virtual camera 20 lowers, the function "f" may preferably be determined so that the change ΔW increases as the change Δy increases.

Figure 9:
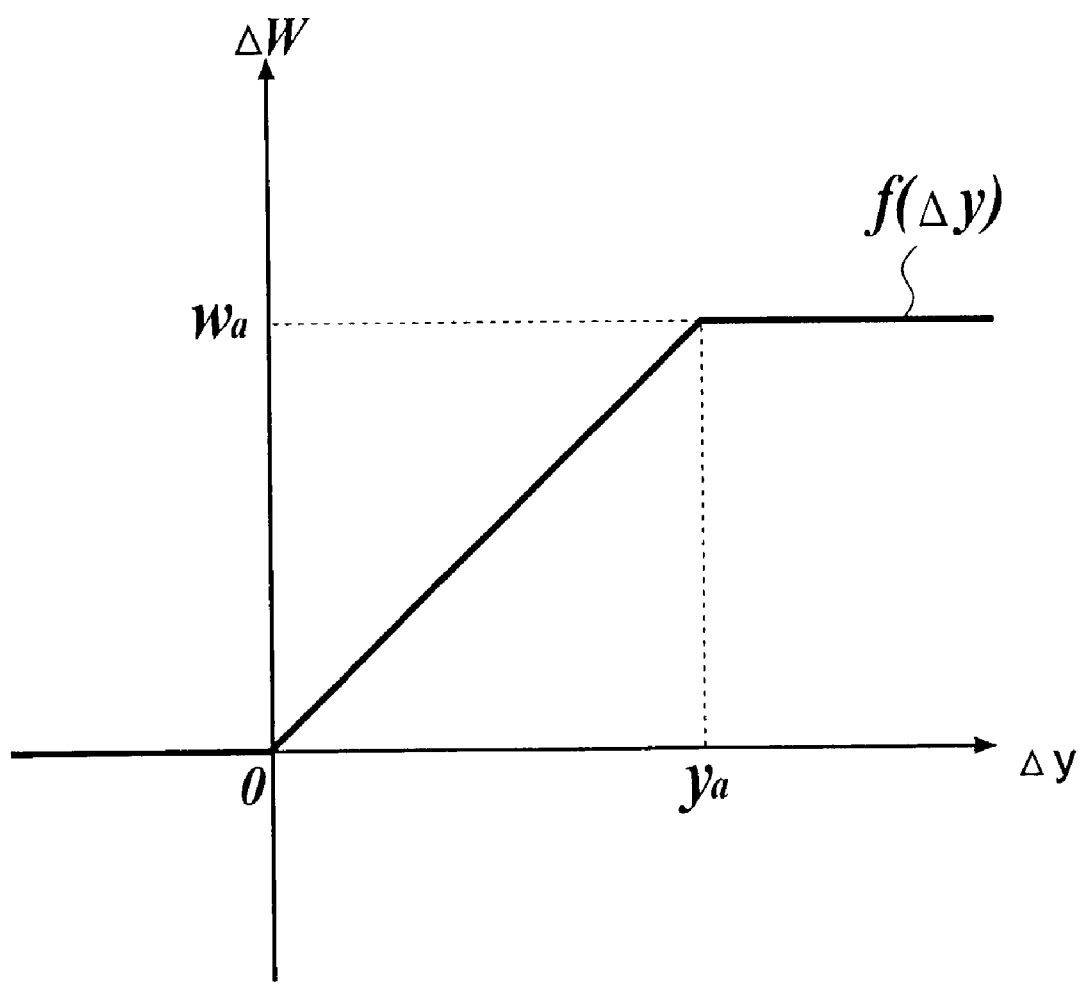
FIG. 9 is a graph showing an example of a relationship function between a change $\Delta W$ of the width of each line polygon and a change $\Delta y$ of the position of the virtual camera.

Therefore, the function "f" shown in FIG. 9 is adopted as the above-described function "f".

FIG. 9 is a graph showing an example of the relationship function between the change Δy and the change ΔW.

According to the FIG. 9, the equation (1) is the following equation (2).

$$\Delta W = \begin{cases} 0 & (\Delta y \leq 0) \\ A \times \Delta y & (0 < \Delta y < ya) \\ Wa & (ya \leq \Delta y) \end{cases} \quad (2)$$

Herein, "A" is a constant.

That is, the change ΔW is equal to "A×Δy" (ΔW=A×Δy), within the change Δy is larger than "0" and smaller than "ya" (0<Δy<ya). Further, the change ΔW is equal to "0" (ΔW=0), within the change Δy is equal to or smaller than "0" (Δy≦0). Further, the change ΔW is equal to "Wa" (ΔW=Wa), within the change Δy is equal to or larger than "ya" (ya≦Δy).

As shown in the equation (2), the change ΔW of the width W has the upper limitation Wa. Therefore, it is possible to prevent the ratio of the line to the whole tennis court 10 from increasing too much according as the width W of the line polygon increases, and the line from giving an unnatural impression to the display image.

As described above, each vertex, and in detail, each of the vertexes P3 and P4 of the line polygon 1 are moved so that the width W of the line polygon 1 increases by only the change ΔW according to the change Δy from the initial position C, of the height h of the virtual camera 20.

Further, regarding each of the line polygons 2 to 9, like the line polygon 1, each of the vertexes P1 to P4 is moved by only the change ΔW in the moving direction, according to the change Δy from the initial position C, of the height h of the virtual camera 20. That is, each of the vertexes P1 to P4 of each of the line polygons 1 to 9 is changed, so that the width W of each of all the line polygons 1 to 9 increases by only the same change ΔW according to the change of the position of the virtual camera 20.

As described above, the first case has been mainly explained to increase the width W of each of the line polygons 1 to 9. However, the second case of reducing the width W is like the first case.

In the second case, the direction in which each of the vertexes P1 to P4 is moved is opposite to the direction in which each of the vertexes P1 to P4 is moved in the first case. For example, when the moving direction is determined to be "+x" in the first case, the moving direction is determined to be the negative direction along the X-axis in the second case.

Figure 10:
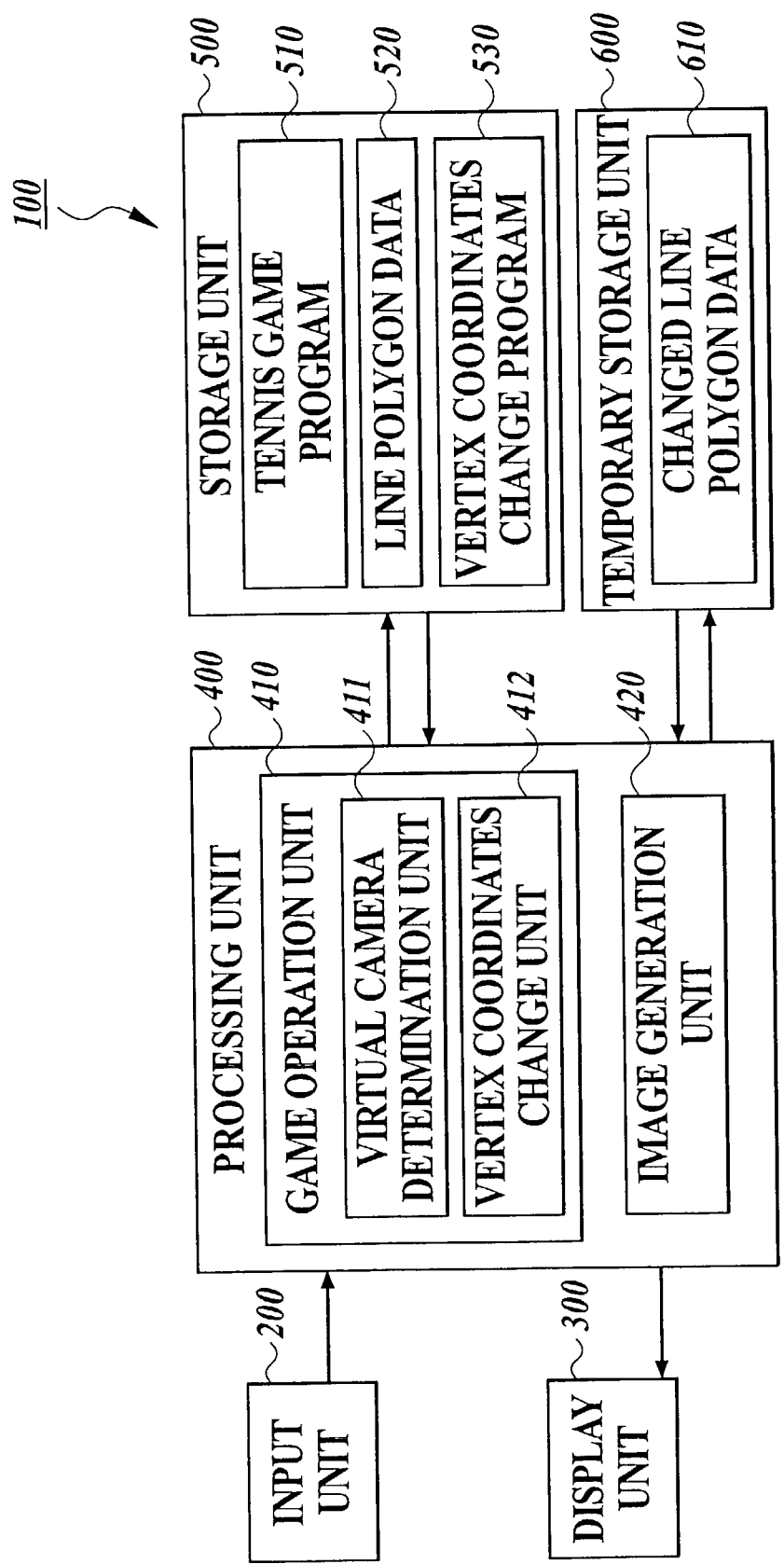
FIG. 10 is a block diagram showing an example of a functional block of a game apparatus according to an embodiment of the present invention.

FIG. 10 is a block diagram showing an example of a functional block of a game apparatus 100 to which the present invention is applied.

As shown in FIG. 10, the functional block of the game apparatus 100, comprises an input unit 200, a display unit 300, a processing unit 400, a storage unit 500 and a temporary storage unit 600.

The input unit 200 is used by a player for inputting an operation data. The input unit 200 has a function which can be realized by hardware such as a lever, buttons, a covering body or the like. When the player operates the input unit 200, for example, when the player pushes any of the buttons or the like, the input unit 200 outputs the operation signal to the processing unit 400.

The display unit 300 displays the game image or the like generated by an image generation unit 420 of the processing unit 400, thereon. Therefore, the player inputs the operation data according to the progress of the game with the input unit 200, with watching the game screen displayed on the display unit 300.

The processing unit 400 performs various processing including the control over the whole game apparatus 100, the instruction to each unit of the game apparatus 100, the game progress processing, the image processing, the sound processing, and so on. The processing unit 400 has a function which can be realized by hardware such as various types processors (CPU(Central Processing Unit), DSP(Digital Signal Processor) or the like), an ASIC(Application Specific Integrated Circuit) or the like, or predetermined program.

Further, the processing unit 400 comprises a game operation unit 410 and an image generation unit 420.

The game operation unit 410 performs the processing of forming the game space, the processing of calculating the position, the posture, the moving speed, the moving direction or the like, of each character, the processing of operating the position or the eyes direction of the virtual camera 20 in the game space, the progress processing in the game such as a story development, or various game processing, on the basis of the operation signal outputted from the input unit 200, the game program read out of the storage unit 500 or the like.

For example, the game operation unit 410 provides the line polygons 1 to 9 and forms the tennis court 10 in the game space, as shown in FIG. 1, on the basis of a changed line polygon data 610 stored in the temporary storage unit 600.

Further, the game operation unit 410 comprises a virtual camera determination unit 411 and a vertex coordinates change unit 412.

The virtual camera determination unit 411 provides the virtual camera 20 at the initial position C which is previously determined, in the game space. When the virtual camera determination unit 411 receives the instruction to change the position, the eyes direction or the like of the virtual camera 20, the virtual camera determination unit 411 changes the position at which the virtual camera 20 is provided, or the like according to the instruction. Further, the virtual camera determination unit 411 performs the processing of adjusting the eyes direction (eyes vector) without changing the fixation point F, with changing the position at which the virtual camera 20 is provided.

Figure 12:
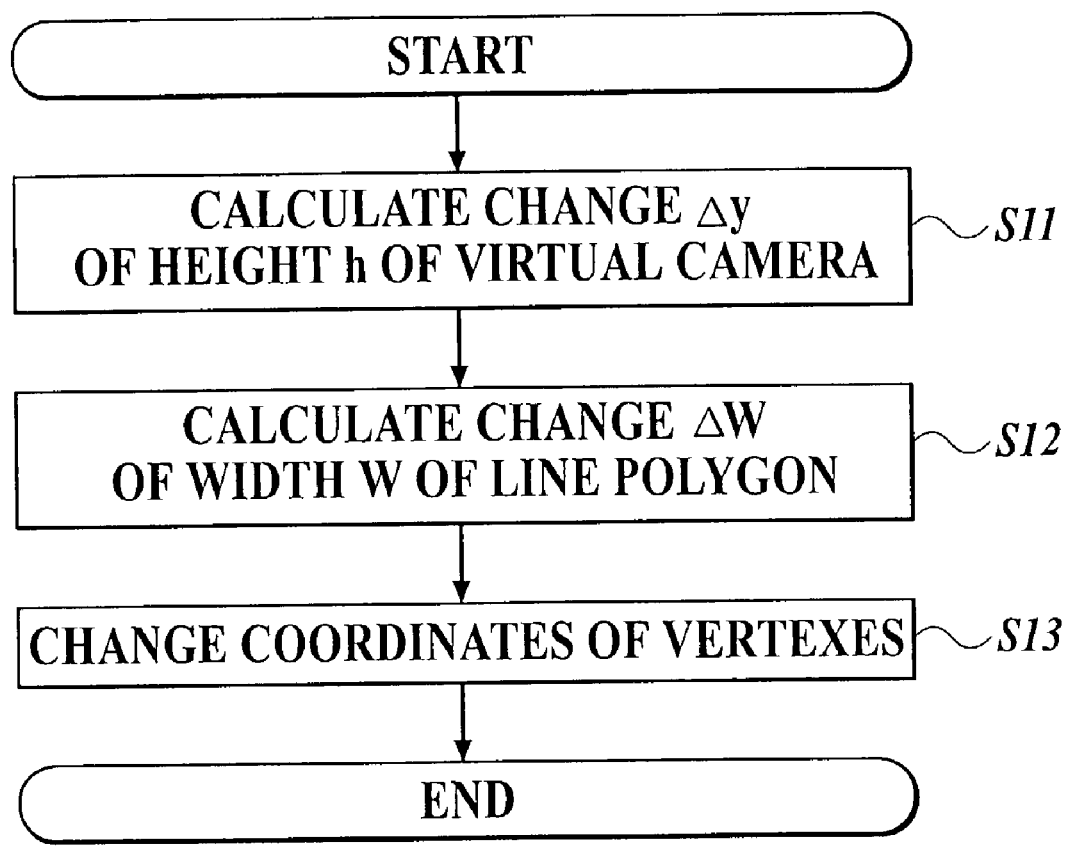
FIG. 12 is a flow chart for explaining a vertex coordinates changing processing.

The vertex coordinates change unit 412 performs the vertex coordinates changing processing shown in FIG. 12 according to a vertex coordinates change program 530 read out of the storage unit 500. That is, when the virtual camera determination unit 411 changes the position of the virtual camera 20, the vertex coordinates change unit 412 changes the coordinates values of each of the vertexes P1 to P4 of each of the line polygons 1 to 9 on the basis of the changed position of the virtual camera 20, and stores the changed coordinates values of each of the vertexes P1 to P4 of each of the line polygons 1 to 9, as a changed line polygon data 610 in the temporary storage unit 600.

The image generation unit 420 performs the processing of generating the image of the game space determined by the game operation unit 410, and viewed from the virtual camera 20, and outputs the image to the display unit 300, or the like.

More specifically, when the image generation unit 420 performs the processing of executing the forward/backward clipping and thereby determining the view volume, the geometry processing including the coordinates conversion and so on, for each polygon, the processing of calculating the brightness based on the view point and the light source, the color interpolation processing, the rendering processing including the hidden surfaces processing and so on, or the like, the image generation unit 420 generates the game image. Thereafter, when the image generation unit 420 outputs the generated game image as image data to the display unit 300, the game image is displayed on the display unit 300.

For example, the image generation unit 420 generates the game image of the game space in which the tennis court 10 is formed by the game operation unit 410, on the basis of the changed line polygon data 610 stored in the temporary storage unit 600.

The storage unit 500 mainly stores a tennis game program 510 regarding the tennis game, a line polygon data 520, the initial position C which is not shown in figures, of the virtual camera 20, and a vertex coordinates change program 530, therein. The storage unit 500 has a function which can be realized by hardware such as a CD-ROM, a MO, a DVD, a memory, a HD or the like.

FIG. 11 is a table showing an example of the line polygon data 520.

As shown in FIG. 11, the line polygon data 520 stores the coordinates, the fixed flag, and the moving direction which are corresponded to each of four vertexes P1 to P4 of each of the line polygons 1 to 9. Herein, the coordinates, the fixed flag and the moving direction are as explained with reference to FIG. 4.

The temporary storage unit 600 is a storage section used as an operating area by the processing unit 400. The temporary storage unit 600 stores various results performed by the processing unit 400, and, for example, the changed line polygon data 610 performed by the vertex coordinates change unit 412, or the like.

The changed line polygon data 610 has the structure in which only the coordinates values are changed by the vertex coordinates change unit 412, in the line polygon data 520 shown in FIG. 11.

The game operation unit 410 forms the tennis court 10 in the game space on the basis of the changed line polygon data 610.

FIG. 12 is a flow chart for explaining a vertex coordinates changing processing performed by the vertex coordinates change unit 412 according to the vertex coordinates change program 530. The vertex coordinate changing processing is performed according to the change of the position at which the virtual camera 20 is provided by the virtual camera determination unit 411.

In FIG. 12, first, the vertex coordinates change unit 412 calculates the change Δy of the height h of the virtual camera 20, on the basis of the position C1 of the virtual camera 20, which is changed by the virtual camera determination unit 411 and the initial position C of the virtual camera 20, which is previously determined and stored in the storage unit 500 (Step S11).

Next, the vertex coordinates change unit 412 calculates the change ΔW the width W of the each line polygon, on the basis of the calculated change Δy, according to the equation (1) (Step S12).

Then, the vertex coordinates change unit 412 refers the polygon data, and changes the coordinates values of each of the vertexes P1 to P4 of each of all the line polygons 1 to 9. More specifically, the vertex coordinates change unit 412 changes only the coordinates values of the vertex having the fixed flag "OFF" so as to move only the vertex in the predetermined moving direction.

For example, regarding the line polygon 1, the vertex coordinates change unit 412 adds only the change ΔW to the Y-axis coordinate value of each of the vertexes P3 and P4, so as to move each of the vertexes P3 and P4 in the positive direction along the X-axis. That is, as shown in FIG. 7, the vertex coordinates change unit 412 changes the vertex P3 (x3, y3, z3) to the vertex P3' (x3+ΔW, y3, z3), and the vertex P4 (x4, y4, z4) to the vertex P4' (x4+ΔW, y4, z4).

When changing the coordinates values of the vertexes which can move in all the polygon lines 1 to 9, the vertex coordinates change unit 412 stores the coordinates values of the changed vertexes as the changed line polygon data 610 in the temporary storage unit 600 (Step S13).

Accordingly, the image generation unit 420 generates the game image including the tennis court 10 on the basis of the changed line polygon data 610, and displays the game image on the display unit 300.

When performing the above-described steps, the vertex coordinates change unit 412 finishes the vertex coordinates change processing.

Next, a example of hardware structure realizable of the game apparatus 100 will be explained with reference to FIG. 13, as follows.

Figure 13:
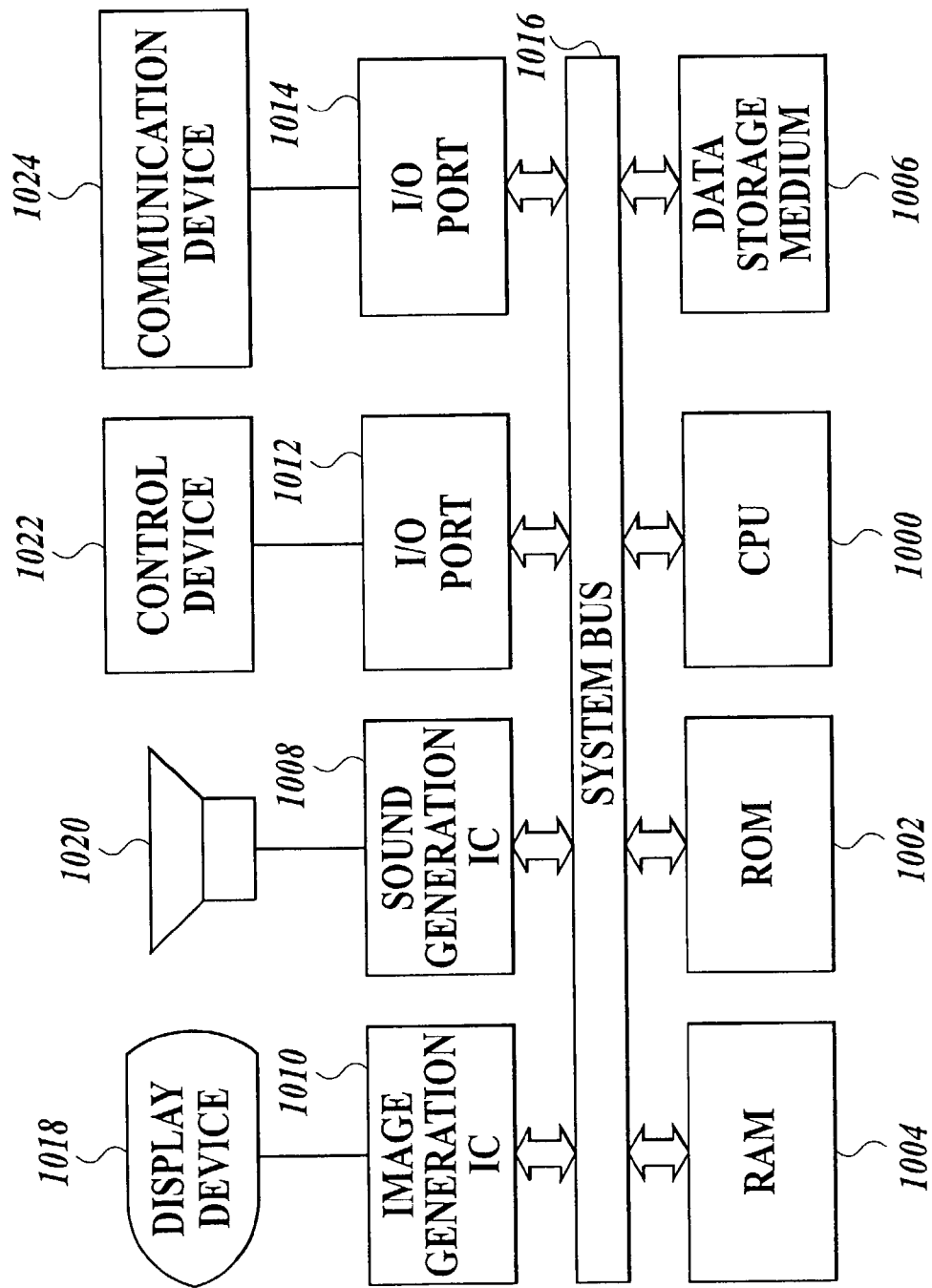
FIG. 13 is a block diagram showing an example of a hardware structure realizable of the game apparatus according to the embodiment of the present invention.

An apparatus as shown in FIG. 13 comprises a CPU 1000, a ROM 1002, a RAM 1004, a data storage medium 1006, a sound generation IC 1008, an image generation IC 1010, and I/O ports 1012 and 1014, that are interconnected by a system bus 1016 so that data can be exchanged therebetween. A display device 1018 is further connected to the image generation IC 1010, a speaker 1020 is further connected to the sound generation IC 1008, a control device 1022 is further connected to the I/O port 1012, and a communication device 1024 is further connected to the I/O port 1014.

The data storage medium 1006 primarily stores programs, image data for representing objects, sound data, play data or the like. Further, the data storage medium 1006 corresponds to the storage unit 500 shown in FIG. 10.

For example, in case the present invention is realized in a consumer game machine, a CD-ROM, a game cassette, a DVD or other medium is used as the data storage medium 1006 for storing game programs or other data, and a memory card or other medium is used as the data storage medium 1006 for storing the changed line polygon data 610. In case the present invention is realized in a personal computer a CD-ROM, a DVD, a hard disc or other medium is used as the data storage medium 1006. In case the present invention is realized in an arcade game machine, a hard disc such as a ROM or other medium is used as the data storage medium 1006. In the case, the data storage medium 1006 is realized by the ROM 1002.

The control device 1022 is equivalent to a game controller, an input operating panel or the like. Therefore, the control device 1022 is used by a player for inputting to the results decided by the player according to the game progress, to the apparatus body. Further, the control device 1022 corresponds to the input unit 200 shown in FIG. 10.

The CPU 1000 controls the whole apparatus and performs various data processing, according to programs or data stored in the data storage medium 1006, the system program including initialization data for the apparatus and so on, stored in the ROM 1002, signals outputted from the control device 1022, or the like.

The RAM 1004 is a storage means used as an operating memory by the CPU 1000. Further, the RAM 1004 temporarily stores one frame image data or play data, particular contents of the data storage medium 1006 or the ROM 1002, operating results of the CPU 1000, or the like, therein. The RAM 1004 corresponds to the temporary storage unit 600 shown in FIG. 10.

The sound generation IC 1008 and the image generation IC 1010 are also disposed in such a type of game apparatus, to generate and output game sounds and game images appropriate to the game.

The sound generation IC 1008 is an integrated circuit for generating game sounds such as sound effects, background music or the like, on the basis of data stored in the data storage medium 1006 or the ROM 1002. The game sounds generated by the sound generation IC 1008 are outputted from the speaker 1020.

The image generation IC 1010 is an integrated circuit for generating pixel data to be outputted to the display device 1018, on the basis of image data outputted from the RAM 1004, the ROM 1002, the data storage medium 1006 or the like.

The display device 1018 can be realized by a CRT, a LCD, a TV, a plasma display, a projector or the like. Further, the display device 1018 corresponds to the display unit 300 shown in FIG. 10.

The communication device 1024 is a device for communicating various data used by the game apparatus 100 with an external device When the game apparatus 100 is connected with another game apparatus, the communication device 1024 is used for communicating predetermined data corresponding to the game program 510, the game program 510, or other data with another game apparatus, through the predetermined communications line.

Various processing performed by the image generation IC 1010, the sound generation IC 1018, or the like, may be performed by the CPU 1000, a general DSP or the like, as a software. In the case, the CPU 1000 corresponds to the processing unit 400 shown in FIG. 10.

Figure 14A:
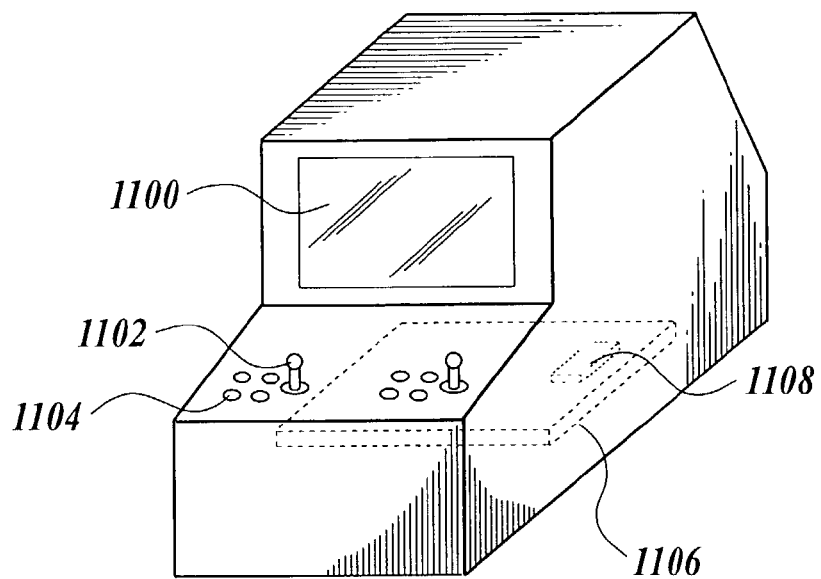
FIGS. 14A and 14B are views showing examples to each of which the game apparatus according to the embodiment of the present invention is applied.

FIG. 14A is a view showing an example of the case the present invention is applied to an arcade game machine.

As shown in FIG. 14A, a player enjoys playing a game by controlling a lever 1102, buttons 1104 or the like, with watching game images displayed on a display 1100. Various types processors, various types memories or the like are mounted on a system board (circuit board) 1106 contained in the arcade game machine. Various data including programs, data and so on, which is required to perform the present invention, is stored in a memory 1108 as a data storage medium mounted on the system board 1106. Hereinafter, the data will be called storage data.

Figure 14B:
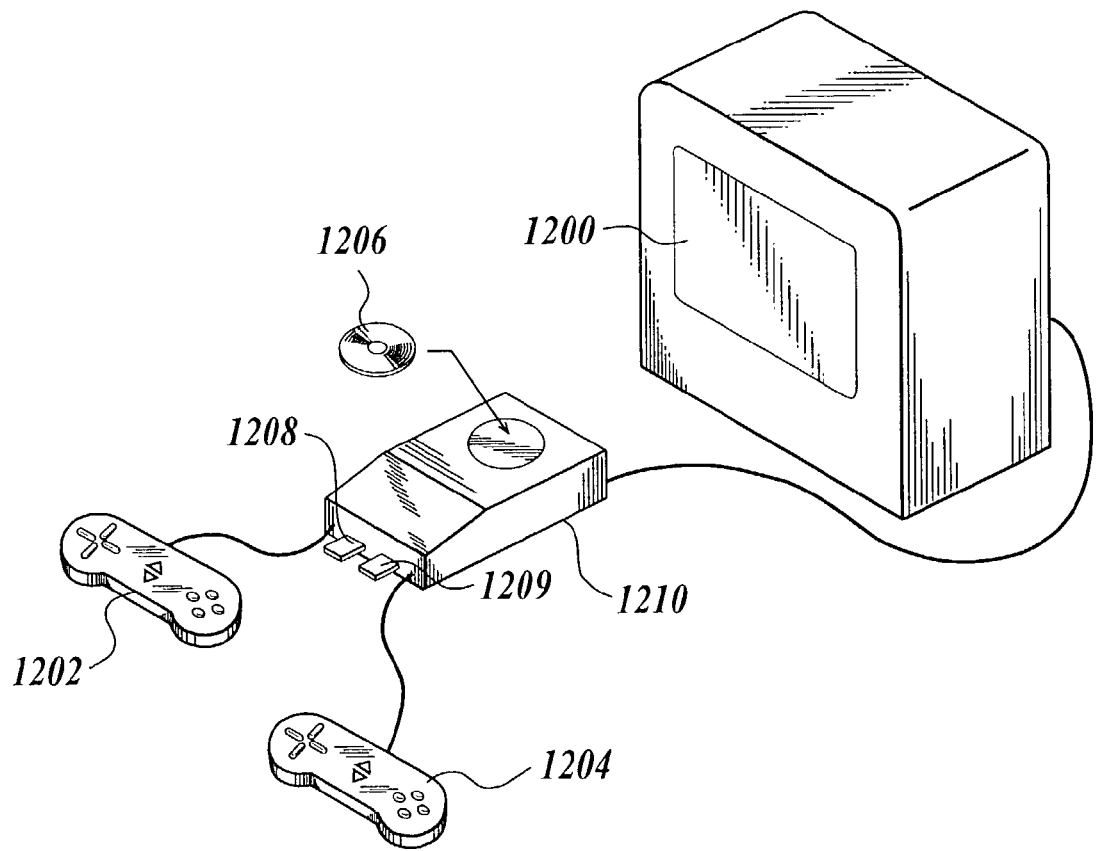

FIG. 14B is a view showing an example of the case the present invention is applied to a consumer game machine.

As shown in FIG. 14B, a player enjoys playing a game by controlling a game controller 1202 or 1204, with watching game images displayed on a display 1200. In the case, the above-described storage data is stored in a CD (DVD) 1206, a memory card 1208 or 1209, or the like, as a data storage medium which can be attached to detached from the machine body.

More specifically, in order to realize the game apparatus 100 according to the embodiment of the present invention, the present invention can be applied to not only the above-described arcade game machine or the above-described consumer game machine, but also, for example, a portable game machine, a personal computer, a portable terminal including a portable telephone, a kiosk terminal, or the like.

Although the present invention has been explained according to the above-described embodiment, it should also be understood that the present invention is not limited to the embodiment and various changes and modifications may be made to the invention without departing from the gist thereof.

For example, it has been explained that the width W of the line polygon is changed according to the change $\Delta y$ of the height h of the virtual camera 20. However, the width W of the line polygon may be changed according to another parameter of the virtual camera 20, for example, a change of a depression angle, a view angle, or an eyes direction (eyes vector) of the virtual camera 20.

Figure 15A:
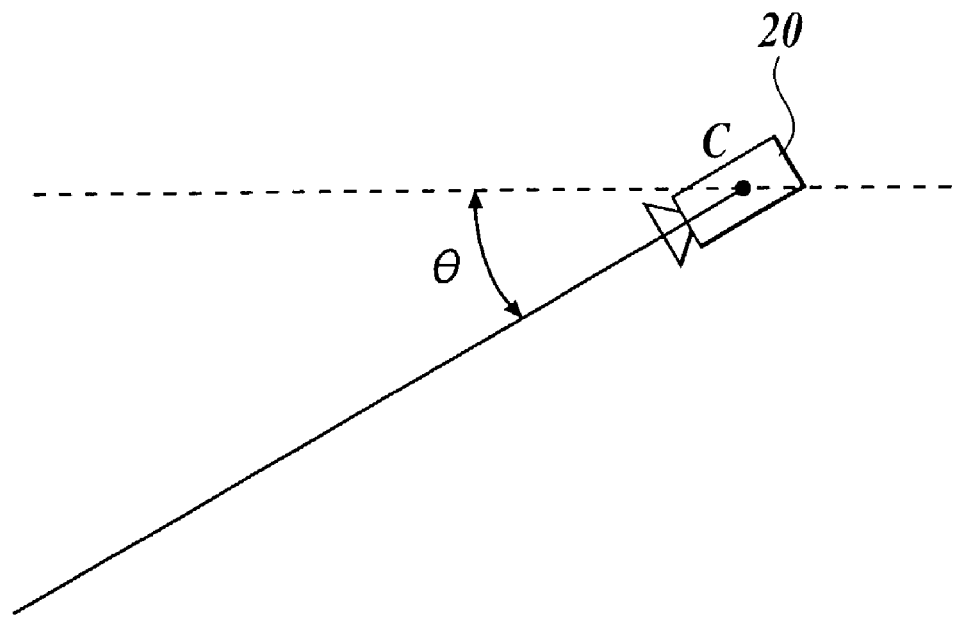
FIGS. 15A and 15B are views for explaining a change of a depression angle $\theta$ of the virtual camera.
Figure 15B:
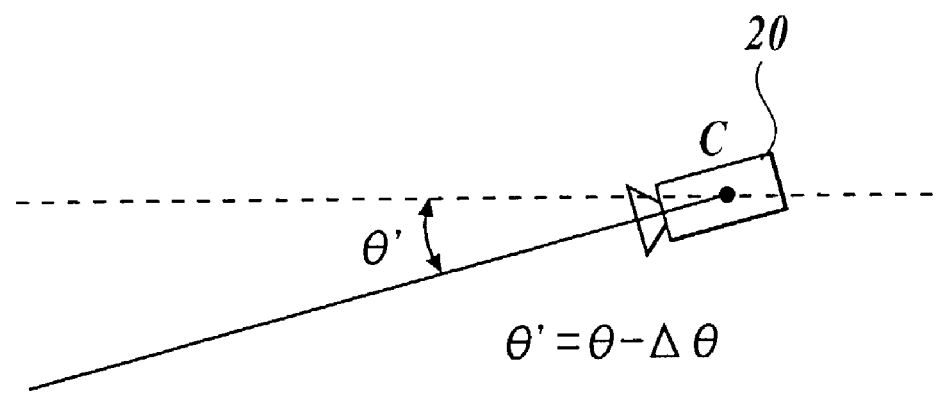

That is, for example, in case the width W of the line polygon is changed on the basis of the change of the depression angle, in other words, on the basis of the change $\Delta \theta$ from the depression angle $\theta$ shown in FIG. 15A to the depression angle $\theta'$ shown in FIG. 15B, the change $\Delta W$ of the width W of the line polygon is determined on the basis of the change $\Delta \theta$ of the depression angle $\theta$. In order to determine the change $\Delta W$, the following equation (3) is adopted instead of the equation (1).

$$\Delta W = f1(\Delta \theta) \quad (3)$$

The width W of the line polygon may be changed according to a distance between the virtual camera 20 and the tennis court 10.

That is, for example, the change $\Delta W$ of the width W of the line polygon is determined on the basis of a distance D between a representative point at the center of the tennis court 10 and a representative point of the virtual camera 20. In order to determine the change $\Delta W$, the following equation (4) is adopted instead of the equation (1).

$$\Delta W = f2(D) \quad (4)$$

The width W of the line polygon may be changed according to a distance between each line polygon and the virtual camera 20.

That is, for example, the change $\Delta W$ of the width W of the line polygon is determined on the basis of a distance Dn between a representative point at the center of each line polygon and the representative point of the virtual camera 20. In order to determine the change $\Delta W$, the following equation (5) is adopted instead of the equation (1).

$$\Delta W = f3(Dn) \quad (5)$$

Further, it has been explained that all the distances by which the vertexes are moved respectively, to increase the width W of the line polygon, are same as each other, according to the above-described embodiment. However, the distances may be changed for every vertex.

That is, the changes $\Delta W1$ to $\Delta W4$ are determined for the vertex P1 to P4, respectively. In order to determine each of the changes $\Delta W1$ to $\Delta W4$, the following equation (6) is adopted instead of the equation (1).

$$\Delta Wn = fn(\Delta y) \quad (6)$$

Herein, "n" is any one of 1 to 4 (n=1, 2, 3 or 4).

Figure 16A:
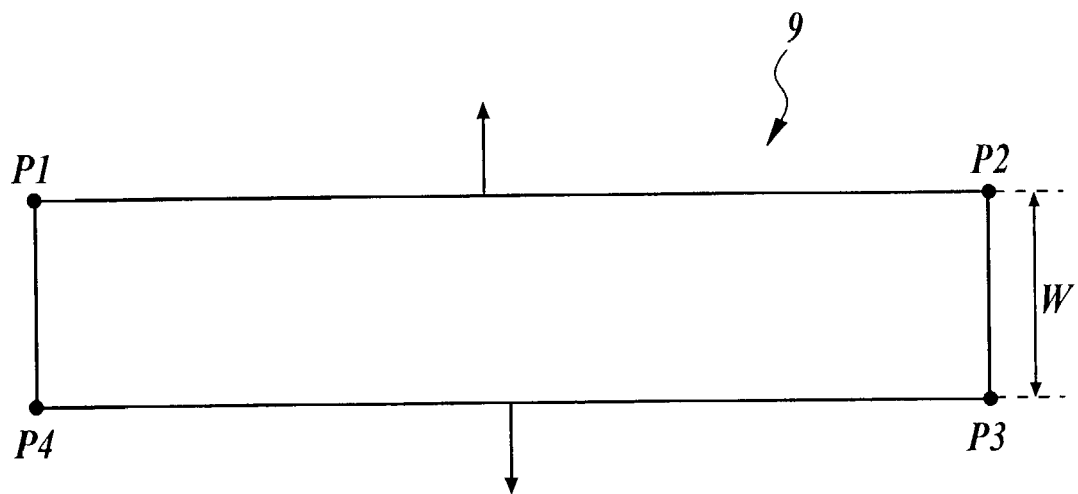
FIGS. 16A and 16B are views showing modified example of the line polygon 9.
Figure 16B:
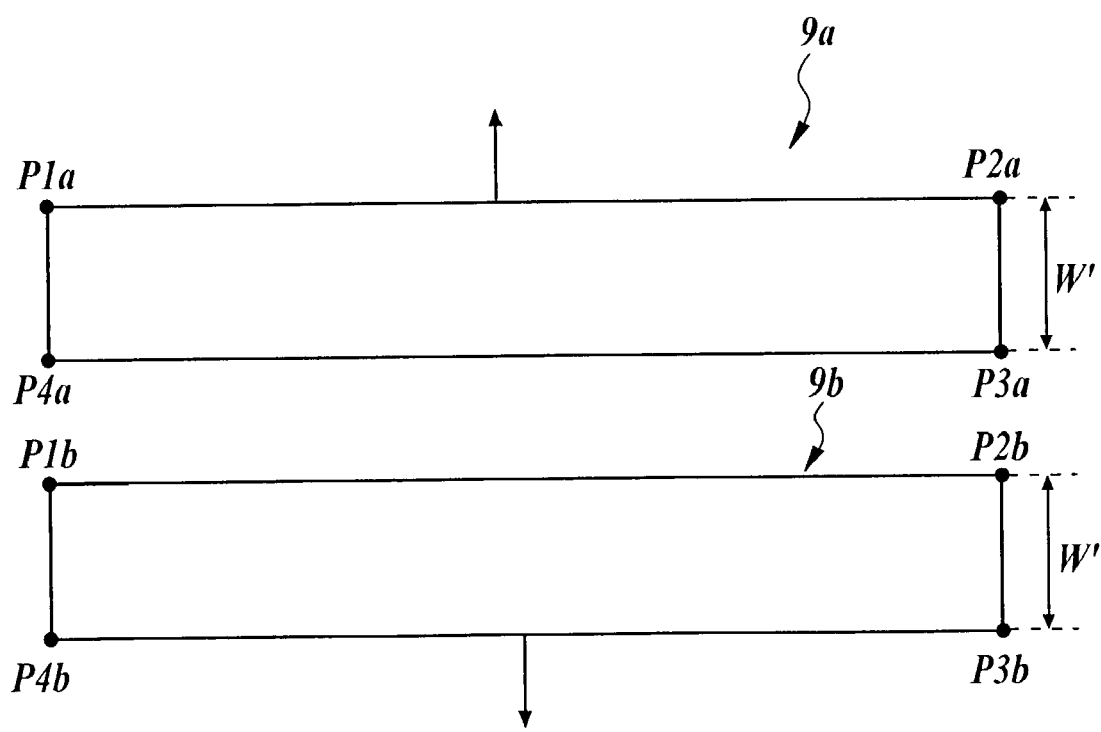

Further, the structure of the line polygons forming the tennis court 10 is not limited to the example shown in FIG. 2. That is, it is not always necessary that one line polygon is corresponded to one line. For example, the line polygon 9 as shown in FIG. 16A, may have the structure comprising two line polygons 9a and 9b each of which has a width W'(=W/2), as shown in FIG. 16B.

In the line polygons 9a and 9b, a vertex P1a and a vertex P2a of the line polygon 9a correspond to the vertex P1 and the vertex P2, respectively, and a vertex P3b a vertex P4b of the line polygon 9b correspond to the vertex P3 and the vertex P4. Further, a vertex P3a and a vertex P4a of the line polygon 9a coincides with a vertex P2b and a vertex P1b of the line polygon 9b, respectively.

Further, the vertexes P4a, P3a, P1b and P2b are determined to be impossible to move, that is, the fixed flags of the vertexes P4a, P3a, P1b and P2b are determined to be "ON". The vertexes P1a and P2a are moved in the upper direction in FIG. 16B, and the vertexes P3b and P4b are moved in the lower direction in FIG. 16B.

Further, each vertexes of the line polygons may be moved in not only the direction along the X-axis or the Z-axis, but also the arbitrary direction, for example, the direction along the Y-axis.

That is, for example, the positional relationship (far/near) among four vertexes P1 to P4 is determined, and any of the vertexes P1 to P4, which is provided at the far position, may be moved in the positive direction along the Y-axis, so that the eyes direction (eyes vector) of the virtual camera 20 and the normal line vector of the line polygon is parallel to each other.

Further, in case the position or the eyes direction of the virtual camera changes voluntarily, for example, at a replay time or the like, the width W of the line polygon may be changed according to the change of the position or the eyes direction of the virtual camera. The position or the eyes direction of the virtual camera may be changed on the basis of the instruction of the player through the input unit 200.

Further, it is unnecessary that the present invention is limited to the above-described tennis game. It is needless to say that the present invention can be applied to various games such as a soccer game, a baseball game or the like, wherein lines are drawn on a court or a ground.

According to the present invention, the following effects will be indicated.

As described above, because the width of the line object provided in the game space which is the virtual space, having the fixed boundary line portion which is at least one portion of the boundary of the predetermined plane area, is widened, it is possible to prevent the phenomenon from occurring that the line (white line) is not seen easily or disappears as the normal line vector of the line object and the eyes direction (eyes vector) becomes vertical to each other.

Further, because the direction in which the width of the line object is changed is the inside of the plane area, the plane area provided in the game space is not changed. Consequently, it is possible to prevent the changing the width of the line object from affecting the progress of the game.

Furthermore, because the change of the width of the line object is determined on various conditions such as the position of the view point (for example, the height from the plane area, of the view point), the distance between the view point and the plane area or the line object, or the like, it is possible to display the game image wherein the line (white line) is seen easily, for example, according to the condition of the replay time or the like.

The entire disclosure of Japanese Patent Application No. Tokugan 2001-237086 filed on Aug. 3, 2001 including specification, claims, drawings and summary are incorporated herein by reference in its entirety.

What is claimed is:

1. A method for generating image data of a virtual space viewed from a predetermined view point, comprising:
   determining a boundary of a predetermined plane area in the virtual space;
   providing a line object having one boundary line portion which is at least one portion of the boundary of the predetermined plane area and having a predetermined width towards an inside of the predetermined plane area; and
   changing the width of the line object while a position of the one boundary line portion of the line object remains fixed.

2. The method as claimed in claim 1, wherein the changing the width of the line object comprises changing a width of one end portion of the line object and a width of the other end portion of the line object separately.

3. The method as claimed in claim 1, wherein the changing the width of the line object comprises changing the width of the line object on the basis of at least one of a position, a depression angle, an eyes direction and a view angle of the view point.

4. The method as claimed in claim 1, wherein the changing the width of the line object comprises changing the width of the line object on the basis of at least one of a distance between the view point and the plane area and a distance between the view point and the line object.

5. The method as claimed in claim 1, wherein the changing the width of the line object affects regenerating the image data of the virtual space.

6. The method as claimed in claim 1, further comprising: inclining the line object at a predetermined angle while the position of the one boundary line portion remains fixed.

7. The method as claimed in claim 1, wherein the line object comprises at least one of a straight line object and a curved line object.

8. The method as claimed in claim 7, wherein the one boundary line portion is at least one side of the boundary when the line object is a straight line object.

9. The method as claimed in claim 1,
   wherein the providing the line object comprises providing an internal line object having one line portion and another line portion each of which is not one portion of the boundary, and a predetermined width; and
   the changing the width of the line object comprises changing the width of the internal line object by moving both the one line portion and the another line portion.

10. The method as claimed in claim 1, wherein the virtual space is a game space of a predetermined game.

11. A method for generating image data of a virtual space viewed from a predetermined view point, comprising:
    determining a boundary of a predetermined plane area in the virtual space;
    providing at least one line object having at least one line portion and having a predetermined width on the basis of the boundary; and
    changing the width of the line object by moving the at least one line portion of the line object.

12. An apparatus comprising:
    an image generating section for generating image data of a virtual space viewed from a predetermined view point;
    a determining section for determining a boundary of a predetermined plane area in the virtual space;
    a providing section for providing a line object having one boundary line portion which is at least one portion of the boundary of the predetermined plane area and having a predetermined width towards an inside of the predetermined plane area; and
    a changing section for changing the width of the line object while a position of the one boundary line portion of the line object remains fixed.

13. The apparatus as claimed in claim 12, wherein the changing section changes a width of one end portion of the line object and a width of the other end portion of the line object separately.

14. The apparatus as claimed in claim 12, further comprising a game execution unit for executing a predetermined game according to image data of a game space of the predetermined game, which is generated by the image generation section as the virtual space.

15. A storage medium having a program recorded thereon, when the program is loaded onto an operating apparatus, the program making the operating apparatus execute the method as claimed in any one of claims 1 to 6.

16. A program, when the program is loaded onto an operating apparatus, to make the operating apparatus execute the method as claimed in any one of claims 1 to 6.

* * * * *

UNITED STATES PATENT AND TRADEMARK OFFICE
CERTIFICATE OF CORRECTION

PATENT NO. : 7,118,480 B2
APPLICATION NO. : 10/201715
DATED : October 10, 2006
INVENTOR(S) : Hidefumi Aoki It is certified that error appears in the above-identified patent and that said Letters Patent is hereby corrected as shown below:

Column 5,
Line 13 - change "came" to --game--.

Column 6,
Line 37 - change ""OFF." to --"OFF".--

Column 7,
Line 35 - change "P4'" to --P4.--

Column 11,
Line 65 - change "computer" to --computer,--

Column 12,
Line 45 - change "device" to --device.--

Column 13,
Line 8 - change "to" to --or--.

Signed and Sealed this

Ninth Day of January, 2007

JON W. DUDAS
*Director of the United States Patent and Trademark Office*